Nov. 29, 1966 D. SILVERMAN 3,288,243
PHASE VARYING CONTINUOUS WAVE SEISMIC SURVEYING SYSTEM
Filed Oct. 25, 1963 2 Sheets-Sheet 1
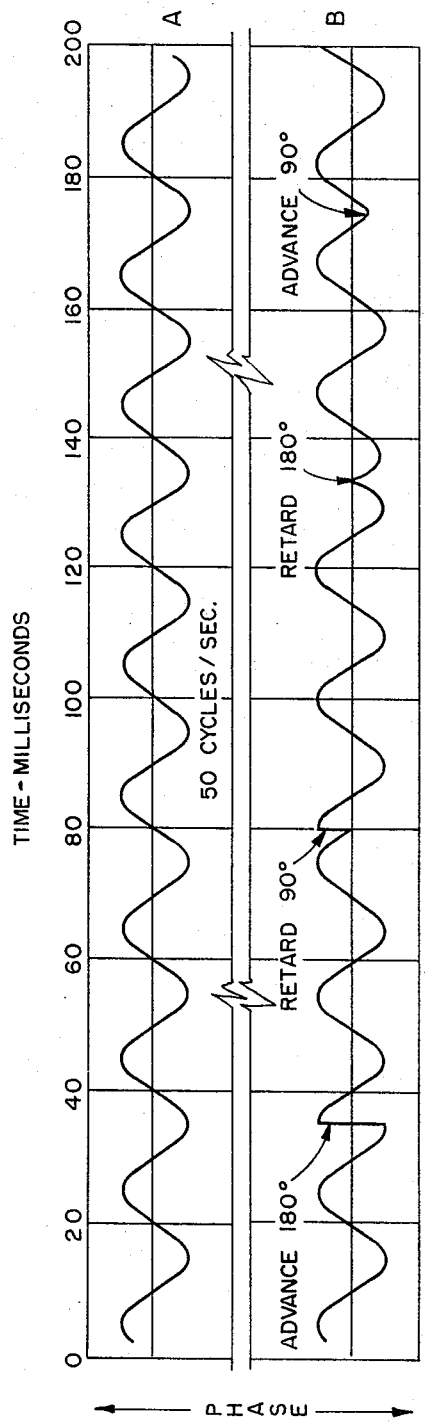
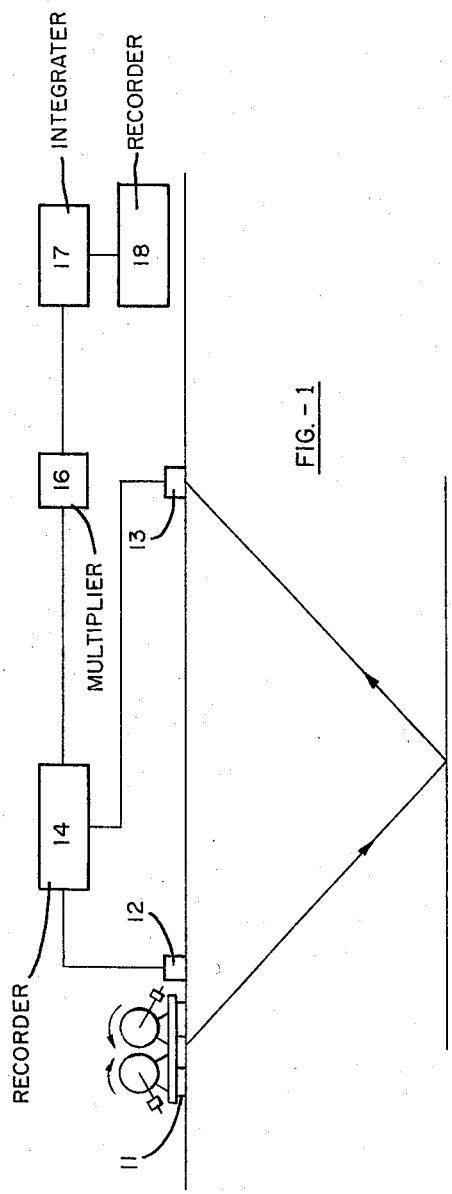
DANIEL SILVERMAN
INVENTOR.
BY *William F. McClure*
ATTORNEY.

Nov. 29, 1966   D. SILVERMAN   3,288,243
PHASE VARYING CONTINUOUS WAVE SEISMIC SURVEYING SYSTEM
Filed Oct. 25, 1963   2 Sheets-Sheet 2

DANIEL SILVERMAN
INVENTOR.

BY William T. McClain

United States Patent Office 3,288,243
Patented Nov. 29, 1966

3,288,243
PHASE VARYING CONTINUOUS WAVE SEISMIC SURVEYING SYSTEM
Daniel Silverman, Tulsa, Okla., assignor to Pan American Petroleum Corporation, Tulsa, Okla., a corporation of Delaware
Filed Oct. 25, 1963, Ser. No. 318,934
2 Claims. (Cl. 181—.5)

This invention relates to seismic geophysical surveying, and more particularly it concerns a seismic surveying system utilizing an improved input signal which is readily identified on a seismic record.

In one form of seismic surveying an elastic wave signal is created in the earth and received at one or more locations remote from the place of signal input after traveling along various paths in the earth. The time required for the seismic waves to travel various paths within the earth to the receiving location may be used in determining the earth's structure. It is necessary to identify the received signals in order to determine the time required for a signal to travel between the input and receiving locations. During transmission through the earth, seismic signals become distorted and noise interferes, so that signal identification is oftentimes difficult, if not impossible.

Heretofore, various methods and apparatus have been developed to aid in identifying seismic signals transmitted through the earth in order that the travel time of a seismic wave signal impressed upon the earth may be determined. For example, in U.S. Patent 2,779,428 I have disclosed a method of improving the signal-to-noise ratio of a seismic surveying system by cross-correlating transmitted seismic waves with an artificial wave train to substantially improve the signal-to-noise ratio. Other seismic surveying systems, such as described in U.S. Patents 2,688,124 and 2,989,726 employ a varying frequency signal which is nonrepetitive over the period of the signal duration. In such systems the desired signal is distinguished from unwanted signal components by multiplying the transmitted signal received at a detecting location by a signal substantially free of interference, and integrating the product over a time period, while shifting the time-phase between the two signals during the integration.

In the above-mentioned systems the correlation coefficient, which is indicative of effectiveness of the cross-correlation technique, is a function of the duration of the signal produced by the vibrator and of the width of the frequency sweep. However, it is known that oftentimes a significant portion of the swept frequency signal is lost because the earth will not pass that part of the signal in a particular frequency range. Thus, the effectiveness of the swept frequency signal is reduced under such conditions.

A primary object of the present invention is a seismic surveying system providing improved ability to distinguish a desired signal from unwanted components. A further object is a seismic exploration system providing a greater degree of flexibility in choice of input signal and wherein transient changes may be made in the phase and amplitude of a signal applied to the earth. Another object is apparatus for producing seismic wave signals in a larger variety of wave forms, and having a greater degree of uniqueness than heretofore obtainable. Still another object is a seismic exploration system wherein the operator may select a basic signal frequency, which is the optimum pass frequency of the earth, while maintaining a high degree of uniqueness in the signal transmitted through the earth. These and other objects of the invention will become more apparent from the following description of my invention taken in connection with the accompanying drawings.

In accordance with my invention, a phase-modulated seismic signal is employed in seismic surveying to discriminate against noise, i.e., energy arriving at the seismic detectors which results from sources other than the energy source used for transmitting the desired signal. In the practice of the invention, the travel time of a seismic signal transmitted from a first location to a receiving location is determined by impressing a seismic signal upon the earth at a first location and transmitting the resulting seismic signal along a plurality of paths through the earth to a receiving location spaced from said first location, while varying the phase of the signal impressed upon the earth during the duration of the signal. Typically, the signal is a vibratory signal having a duration at least as long as the greatest travel time required for the signal to travel from the first location to the receiving location at a useful energy level, and the method of operation includes: reproducibly recording the transmitted signals arriving at the receiving location; providing a pilot signal substantially identical with the vibratory signal impressed upon the earth; and cross-correlating the transmitted signals and the pilot signal to obtain a parameter of the travel time of the transmitted signals from the first location to the receiving location.

In a preferred embodiment of my invention there is provided seismic surveying apparatus which comprises signal generator means for creating in the earth at a first location a seismic signal which is varied in phase over its duration; means for detecting the resulting signal transmitted through the earth to a receiving location; and means connected to said detecting means for reproducibly recording a function of the transmitted signal. A preferred apparatus for generating the above seismic signals comprises a rotary vibrator for producing a vibratory seismic signal; drive means connected to said vibrator for rotating the same; and phase shifting means connected to said vibrator for suddenly varying the phase of said signal while said vibrator is being rotated.

As described in the above-mentioned patents, it is well known in the art to determine the travel time of a signal by multiplying a seismic signal transmitted through the earth from a sending location by a substantially noise-free signal derived from the original signal and integrating the resulting products at different time-phase relationships of the signals with respect to their time-phase relation as originally recorded to improve the signal-to-noise ratio. Such a method is commonly referred to as the cross-correlation method. The values obtained at the end of the integration period are plotted as correlation curves, or correlograms, and indicate, as a function of the amount of the time-phase shift, the degree of correlation existing between the transmitted signal and the components of the received composite signal. The maxima of time-phase shifts producing the correlogram are then parameters of the travel times of the signal transmitted along the various paths between the sending location and the receiving location. The foregoing technique is referred to herein as cross-correlation. Various steps employed in the cross-correlation technique may be performed manually; however, it is generally preferred to perform the steps automatically, and various recording, multiplying, integrating and time-phase shifting apparatus is well known in the art for this purpose. Since such apparatus does not form a novel part of the present invention, it need not be described in detail herein. While the cross-correlation technique is especially well adapted for use in the practice of my invention, it will be understood that various other such techniques may be employed in the practice of the invention.

The present invention will be better understood by reference to the following description thereof and to the accompanying drawings illustrating a preferred form of my invention. In the drawings.

FIGURE 1 diagrammatically illustrates a cross section of the earth and a typical equipment setup employed in the practice of the invention;

FIGURE 2 illustrates a typical plot of signal phase versus time for the vibratory signals produced by the apparatus of FIGURE 1;

Figure 3:
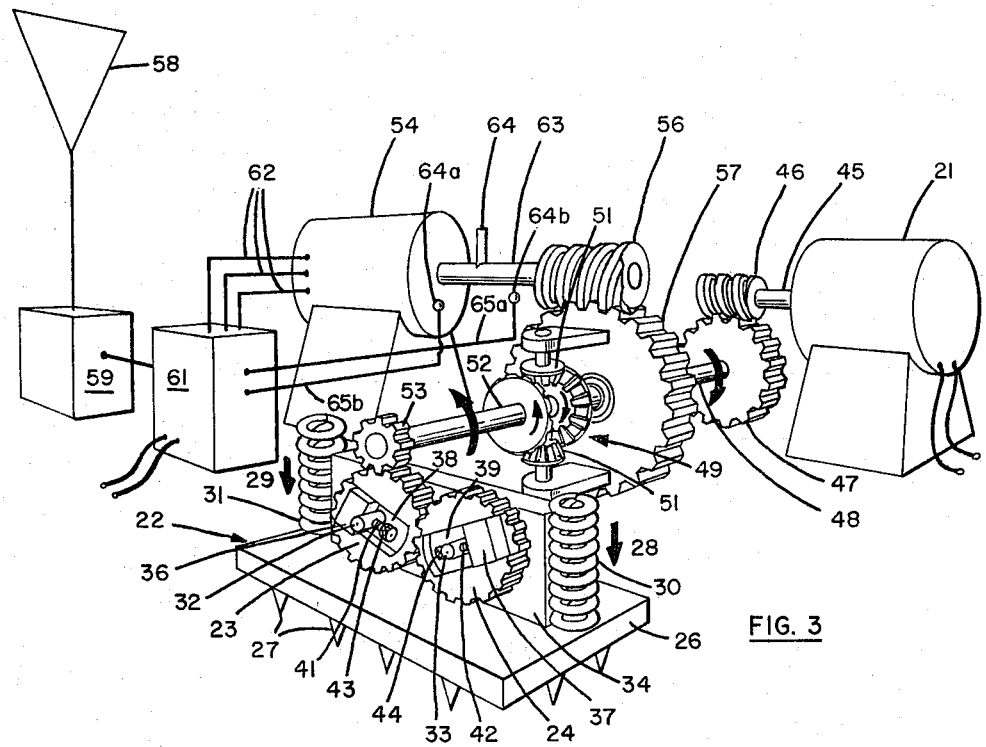
FIGURE 3 illustrates a perspective view of a preferred embodiment of apparatus employing a differential mechanism to accomplish the shift in signal phase according to the invention.

Heretofore, it has been determined that it is beneficial to employ as a source of vibratory seismic signals a vibrator which produces a unique signal made up of a succession of energy pulses and which has a frequency varying over the duration of the signal so that it is non-repetitive in nature. While such a method of providing unique signals is very useful, it has been determined that in certain instances a significant portion of the swept frequency signal is not useable because of the characteristics of the earth in the location being surveyed. Since the correlation coefficient is determined to a large degree by the duration of the signal produced and by the degree of uniqueness, e.g., the width of the frequency sweep, the effectiveness of the swept frequency signal is reduced under these circumstances.

The present invention provides seismic surveying apparatus permitting greater flexibility in the choice of input signal, with a larger variety of wave forms in order to achieve a greater degree of signal uniqueness. Consequently, a greater effectiveness is obtainable in the use of the cross-correlation technique, or other such techniques employed to discriminate against noise.

Referring now to FIGURE 1, there is shown a typical seismic surveying setup. As shown, a vibrator 11, preferably comprising two unbalanced, counter-rotating masses connected to a base plate coupled to the earth's surface 10, is used to generated vibratory elastic wave signals for transmission through the earth. The vibrator is so constructed that the unbalanced masses move vertically in unison, so that the unbalanced forces generated by their rotation are additive in the vertical direction, while the horizontal force components generated cancel one another. Seismic detector 12 is located adjacent the vibrator, and preferably is connected to the vibrator, to receive a vibratory signal therefrom which is substantially free from any noise created during the transmission of the signal through the earth. Remotely positioned from the source of vibrational energy is another seismic detector 13 located at the surface of the earth to receive seismic signals transmitted thereto from vibrator 11. Signals applied to the earth by the vibrator travel various paths to arrive at the remotely positioned detector 13, and, typically, the signals will be traveling downwardly to a reflecting interface 15 and upwardly therefrom to a detector location. Advantageously, a series of vibratory pulses are generated, and the duration of each is at least as great as the greatest time required for a seismic signal to travel from the transmitting location to the receiving location.

Each of the detectors, 12 and 13, produce variations in electrical signals which are a function of the seismic signals received thereby, and these detectors are chosen to produce the desired signal in response to the nature of the signal each receives. As used hereinafter, the electrical signal, or a function thereof, produced by the detector 12 will be referred to as the pilot signal, while the electrical signal, or a function thereof, produced by the detector 13 will be referred to as the transmitted signal. Both of these signals are reproducibly recorded, as on magnetic recorder 14, whereby the signals may be stored for a substantial period of time and later processed. The signal stored by recorder 14 may be reproduced so that representative signals, which are indicative of the frequency, amplitude and phase of the signals originally recorded may be generated at varying times so as to shift the time-phase relation therebetween according to a preselected program. The signals from recorder 14 then may be sent to multiplier unit 16 wherein functions of the transmitted signal and the pilot signal are multiplied, and a signal characteristic of the resulting products is then passed to integrator 17 which sums the products over a preselected period of time. Recorder 18 receives characteristic signals from the integrator and produces a correlogram as mentioned hereinabove, which correlogram indicates the time-phase coincidence between the pilot signal and the transmitted signal, with the maxima being useful as parameters of the travel times of the transmitted signal along the various paths between the location of vibrator 11 and detector 13.

According to the present invention, the phase of the seismic signal is varied during its duration, whether or not any other changes in signal characteristics are desired. Typically, a vibrator of the above type may generate a cyclic succession of oscillations extending over a period of time, or pulses, of constant, randomly varying or continuously varying frequencies and amplitudes over the duration of each pulse, as is well known in the art, or another suitable energy source may be employed. The phase of the signal may be either advanced or retarded through any desired angle. During the duration of the signal the phase shift may occur one or more times, with a larger number of phase shifts being generally desirable.

Referring to FIGURE 3, there is shown one preferred form of apparatus for providing variations in the phase of vibratory seismic signals during its term. A main drive means 21, which may be an electric motor or other suitable drive operating at the desired speed, is employed to rotate vibrator 22 to apply the desired vibratory energy to the earth. Preferably, vibrator 22 comprises two counter-rotating unbalanced masses, such as gears 23 and 24, mounted on a base plate 26 coupled to the earth by means of spikes 27. The total number and configuration of the spikes may, of course, be varied to provide the desired area of intimate contact between the base and the earth. The vibrator produces mainly vertical oscillations, so that vertical forces are impressed upon the earth. The base plate is resiliently held down against the earth by external forces 28 and 29 acting on the resilient members 30 and 31, respectively, which typically are heavy helical compression springs, pneumatic chambers or the like. In this manner the vibrator is elastically coupled to the earth for applying vibrations produced by the vibrator to the earth. Typically, the gears 23 and 24 rotate on two parallel shafts 32 and 33 supported by a suitable frame 34 mounted on the base plate, whereby forces resulting from the rotation of the shafts and the gears are effectively transmitted to the base plate. Adjustable weights 36 and 37 may be mounted on the mechanism to slide in radial guides 38 and 39 provided in gear members 23 and 24, respectively, so that the position of the weights on the rotating gears may be adjusted to vary the moment of the unbalanced rotating weights, so as to increase or decrease the eccentricity and thereby vary the amplitude of vibrator force. The radial movement of weights 36 and 37 may be controlled by mechanical, hydraulic or electrical means. Preferably, this movement is controlled by rotating lead screws 41 and 42 driven by adjusting means 43 and 44. For this purpose, step or selsyn motors may be employed which will accurately follow the angle of rotation of a master selsyn. Thus, the precise position of the weights 36 and 37 may be remotely controlled with respect to the axis of rotation while the vibrator is rotating to vary the amplitude of the vibratory signal.

Main drive 21 may operate at a constant speed, such as with a synchronous motor, or it may be a variable speed motor with suitable controls to vary the frequency of oscillations of the vibrator according to a preselected schedule. Output shaft 45 from motor 21 drives worm gear 46 which meshes with gear 47 mounted on rotating shaft 48 providing power to mechanical differential 49. As shaft 48 is rotated in one direction the rotary motion is reversed by the bevel gears 51 of the differential mechanism so that a reverse rotary motion is imparted to main drive shaft 52 on which is mounted gear 53 to drive gears 23 and 24 in opposite directions. Thus, the frequency of vibrations produced by the counter-rotating gears varies with the speed of main drive motor 21. Typically, with motor 21 operating at a constant speed, the vibratory signal produced by the rotation of the vibrator will be a suitable constant frequency, which normally may range from ten to sixty cycles per second. Typically, the vibrator output signal is a sinusoidal wave as shown in Part A of FIGURE 2. In this example a constant frequency of fifty cycles per second is employed, although a swept frequency may be employed, or more suitable higher or lower frequencies may be employed.

During the period of the vibratory signal it has been found highly advantageous to vary the phase of the signal as mentioned hereinbefore. In changing the phase it is desirable to cause the phase to be shifted rapidly, rather than over a comparatively long length of time so as to prevent a smearing of the signal. In order to accomplish such a shift in signal phase, the rotation of the counter-rotating masses of the vibrator is sharply advanced or retarded, after which the normal rotational speed may be resumed. Typically, the shaft driving the rotating gears is suddenly advanced or retarded through a significant angle of rotation, which may vary from 0 to 360 degrees, as by coupling a phase shift drive having a strong lock-in torque to the main drive system. Thus, the sudden angular change in the vibrator shaft results in a true phase shift in the signal, rather than a mere change in frequency. This may be accomplished by motor 54 which drives worm gear 56 meshing with gear 57 floating on shaft 48 so that as the motor 54 is actuated an angular movement, or shift in phase, is imparted through the differential mechanism to output shaft 52 and rotating gears 23 and 24 to vary the phase of the vibratory signal impressed upon the earth. Thus, during the period of application of the vibratory signal to the earth the phase of the oscillations may be varied according to a preselected program or they may be varied randomly to produce a highly unique signal.

The phase shift motor 54 advantageously may be controlled, according to a predetermined program, by radio or other suitable signals. For example, radio signals received by antenna 58 and transmitted to control element 59 may be used to actuate reversing switch 61 connected by electrical leads 62 to motor 54 which is of the reversible type so that gear 56 may drive the differential mechanism 49 in either direction. When the shaft 63 rotates through the desired angle, switch arm 64 connected to shaft 63 will strike limit switches 64a and 64b connected by electrical leads 65a and 65b to reversing switch 61 which actuates the motor 54 and causes it to rotate in the desired direction. The positions of the limit switches may be varied, as is well known in the art, to provide a preselected program of phase shifting.

In another embodiment, motor 54 may run continuously in one direction, with a fly wheel provided, if desired, and a quick-acting, high-torque clutch of the double-acting type may be employed to couple the phase shift motor shaft to the main drive shaft.

As shown in Part B of FIGURE 2, the phase of the seismic signal may be initially advanced 180 degrees so that a sudden shift in phase occurs. Of course, it is not feasible to cause such a shift to occur instantaneously, but, as a practical matter, the phase shift will occur over some finite period of time which preferably is as short as possible. Typically, such a phase shift occurs within the time of one second or less and, preferably, within a period of one-tenth to one-half second. After the initial phase advance the phase may again be shifted, typically retarded 90 degrees as shown, with a subsequent retardation of 180 degrees, followed by a subsequent advance of 90 degrees, etc., according to the most desirable program. Thus, assuming that the signal has a duration of approximately seven seconds, the phase may be shifted a relatively large number of times, e.g., ten to twenty times during the term of the signal. From an examination of the plot shown in FIGURE 2 it is apparent that vibratory signals produced according to the present invention possess a greater degree of uniqueness than has been obtainable heretofore, since the phase shifts may be imposed in addition to other variations in signal characteristics such as frequency and amplitude.

Figure 4:
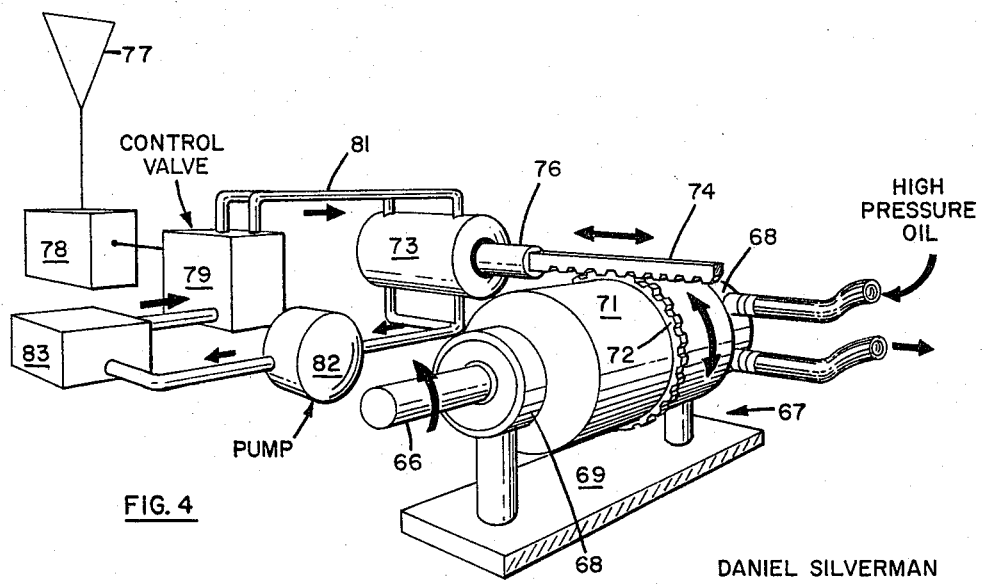
FIGURE 4 is illustrative of a preferred hydraulic motor mechanism employed to shift the signal phase according to the invention.

Alternatively, as shown in FIGURE 4, the vibrator 22 may be driven by a hydraulic motor. The output shaft 66 of the hydraulic motor 67 drives gear 53 as described above. The hydraulic motor may be of any suitable type, and a positive displacement motor, such as a piston type, is especially desirable because of the strong coupling between the rotor and stator. The hydraulic motor is rotatably mounted on bearings 68 supported by base 69 so that the stator 71 may be rotated during the operation of the motor. Gear member 72 rigidly attached to the stator, or motor housing, is driven by hydraulic cylinder 73 which serves as the phase shift drive. Rack 74 connected to the cylinder ram 76 engages with gear 72 to rotate the motor stator as the ram reciprocates. The hydraulic cylinder may be actuated according to a preselected time program, if desired, by radio, or other suitable signals, reecived by antenna 77 and transmitted to control element 78 which actuates control valve 79 connected to conduit 81 supplying high-pressure fluid, such as oil, from pump 82 and reservoir 83 to cylinder 73 to drive ram 76 in the desired direction. Thus, as the ram 76 travels back and forth, the motor stator 71 is rotated through the desired angle, and this produces a similar rotation of shaft 66, producing a rapid shifting in phase of the signal generated by vibrator 22.

From the foregoing description it is apparent that other means for varying the phase of the vibratory signal may be employed. For example, two or more vibrators driven by synchronous motors, each supplied with alternating current at differing frequencies may be alternately actuated to provide the desired shift in phase of the signal transmitted into the ground. Further, a hydraulic motor employing two or more cylinders, with electrically operated valves controlling the flow of fluid to the motor may be employed so that individual pulses of high-pressure oil are provided to the pistons. In this manner the rate of angular rotation of the crankshaft to which the pistons are connected will be controlled by the pulsing of the oil so that one or more vibrators can be controlled and maintained in accurate phase with one another. Likewise, an internal combustion engine, such as a gasoline engine with timed fuel injection, may be employed to obtain the desired changes in phase as described above.

The foregoing description of a preferred embodiment of my invention has been given for the purpose of exemplification and is not intended to limit the scope of the appended claims. From the foregoing description, various modifications and variations in the mode of operation and in the details of construction of the apparatus will become apparent to the artisan, and as such, these fall within the spirit and scope of my invention.

I claim:

1. Seismic surveying apparatus comprising: signal generating means for impressing a seismic signal of a given duration upon the earth, said signal generating means comprising at least one unbalanced rotating weight; drive means connected to said weight for rotating the same, said drive means comprising a hydraulic motor so mounted to permit angular rotation of its stator; variable phase shift means coupled to said drive means for sharply shifting the angle of rotation any selected degree to produce such selected shift in the phase of said signal during its duration, said phase shift means including a hydraulic cylinder geared to said hydraulic motor to sharply rotate said stator; and detector means for receiving the resulting seismic signal transmitted through the earth.

2. Seismic surveying apparatus comprising:
  (a) a seismic signal generating means comprising a vibrator adapted to be coupled to the earth at a first location and apply thereto a vibratory signal having a pre-selected duration, said generating means including control means to control the frequency and the amplitude of the signal impressed on the earth, said generating means further including a drive means having a hydraulic motor means adapted for angular rotation of its stator for driving said vibrator;
  (b) variable phase shift means connected to said vibrator for overriding said control means and for sharply shifting the phase of the vibratory signal applied to the earth thereto at at least one predetermined angle selected from the range of ±180° and at at least one selected time during the duration of said vibratory seismic signal, said variable phase shift means including means to apply to said stator of said hydraulic motor means a sharp angular displacement; and,
  (c) detector means for receiving the resulting seismic signals transmitted through the earth to a second location separated from said first location.

References Cited by the Examiner

UNITED STATES PATENTS

| | | | |
|---|---|---|---|
| 2,989,726 | 6/1961 | Crawford et al. | |
| 3,185,250 | 5/1965 | Glazier | 181—0.5 |
| 3,185,958 | 5/1965 | Masterson et al. | 181—0.5 X |
| 3,244,252 | 4/1966 | Burns | 181—0.5 |

SAMUEL FEINBERG, *Primary Examiner.*

BENJAMIN A. BORCHELT, *Examiner.*

M. F. HUBLER, *Assistant Examiner.*